United States Patent
Kelkar et al.

(10) Patent No.: US 12,511,877 B2
(45) Date of Patent: Dec. 30, 2025

(54) OBJECT-AGNOSTIC IMAGE REPRESENTATION

(71) Applicant: ADOBE INC., San Jose, CA (US)

(72) Inventors: Sachin Kelkar, San Jose, CA (US); Ajinkya Gorakhnath Kale, San Jose, CA (US); Midhun Harikumar, Sunnyvale, CA (US)

(73) Assignee: ADOBE INC., San Jose, CA (US)

( * ) Notice: Subject to any disclaimer, the term of this patent is extended or adjusted under 35 U.S.C. 154(b) by 567 days.

(21) Appl. No.: 17/812,596

(22) Filed: Jul. 14, 2022

(65) Prior Publication Data
US 2024/0020954 A1    Jan. 18, 2024

(51) Int. Cl.
*G06V 10/774* (2022.01)
*G06F 16/532* (2019.01)
*G06T 5/77* (2024.01)
*G06T 7/194* (2017.01)
*G06V 10/26* (2022.01)
*G06V 10/75* (2022.01)
(Continued)

(52) U.S. Cl.
CPC .......... *G06V 10/774* (2022.01); *G06F 16/532* (2019.01); *G06T 5/77* (2024.01); *G06T 7/194* (2017.01); *G06V 10/267* (2022.01); *G06V 10/759* (2022.01); *G06V 10/771* (2022.01); *G06V 10/776* (2022.01); *G06T 2207/20081* (2013.01); *G06V 2201/10* (2022.01)

(58) Field of Classification Search
CPC .. G06V 10/774; G06V 10/267; G06V 10/759; G06V 10/771; G06V 10/776; G06V 2201/10; G06V 10/82; G06F 16/532; G06T 5/77; G06T 7/194; G06T 2207/20081; G06T 2207/20084; G06T 7/11
See application file for complete search history.

(56) References Cited

U.S. PATENT DOCUMENTS 12,272,031 B2 * 4/2025 Singh et al. .............. G06T 5/70
2021/0133936 A1 * 5/2021 Chandra .................. G06T 5/50
(Continued)

FOREIGN PATENT DOCUMENTS

CN    114077682 B  *  4/2022

OTHER PUBLICATIONS

Place specific background modeling using recursive autoencoders, Yamaguchi Kousuke (Year: 2019).*
(Continued)

*Primary Examiner* — Michael Horabik
(74) *Attorney, Agent, or Firm* — F. CHAU & ASSOCIATES, LLC

(57) ABSTRACT

Systems and methods for image processing, and specifically for generating object-agnostic image representations, are described. Embodiments of the present disclosure receive a training image including a foreground object and a background, remove the foreground object from the training image to obtain a modified training image, inpaint a portion of the modified training image corresponding to the foreground object to obtain an inpainted training image, encode the training image and the inpainted training image using a machine learning model to obtain an encoded training image and an encoded inpainted training image, and update parameters of the machine learning model based on the encoded training image and the encoded inpainted training image.

16 Claims, 9 Drawing Sheets

(51) Int. Cl.
  *G06V 10/771* (2022.01)
  *G06V 10/776* (2022.01)

(56) References Cited

U.S. PATENT DOCUMENTS

| | | | | |
|---|---|---|---|---|
| 2022/0067519 A1* | 3/2022 | Mishra | | G06V 40/16 |
| 2022/0292654 A1* | 9/2022 | Zhang | | G06T 7/194 |
| 2022/0351348 A1* | 11/2022 | Chae | | G06T 13/205 |
| 2022/0358626 A1* | 11/2022 | Chui | | G06N 20/00 |
| 2022/0366544 A1* | 11/2022 | Kudelski | | G06T 5/60 |
| 2023/0162490 A1* | 5/2023 | Zhang | | G06F 40/166 |
| | | | | 382/159 |

OTHER PUBLICATIONS

A_Novel_Approach_on_Unsupervised_Dynamic_Background_Extraction_Using_Autoencodersm, Ali Nuri Seker (Year: 2021).*
Image_and_video_coding-emerging_standards_and_beyond, Barry G. Haskell (Year: 1998).*
Nearly_lossless_HDR_images_compression_by_background_image_segmentation, Lei Chen (Year: 2016).*
1Chen et al., "A Simple Framework for Contrastive Learning of Visual Representations", arXiv:2002.05709v3 [cs.LG] Jul. 1, 2020, 20 pages.
2Chen et al., "An Empirical Study of Training Self-Supervised Vision Transformers", arXiv:2104.02057v4 [cs.CV] Aug. 16, 2021, 10 pages.
3He et al., "Momentum Contrast for Unsupervised Visual Representation Learning", arXiv:1911.05722v3 [cs.CV] Mar. 23, 2020, 12 pages.
4Suvorov et al., "Resolution-robust Large Mask Inpainting with Fourier Convolutions", 2021, 11 pages.
5Wu et al., Detectron2, 2019, found on the internet at: https://github.com/facebookresearch/detectron2.

* cited by examiner

400

405

410

415

OBJECT-AGNOSTIC IMAGE REPRESENTATION

BACKGROUND

The following relates to generating image representations. Images can be encoded into different representations (e.g., multidimensional vectors) for downstream tasks. For example, two image representations can be compared using a distance metric to determine similarity between the images. If two images are determined to be similar, they can be similarly labeled or returned in response to an image search query.

However, image representations often focus on salient objects within the image. For example, if a user provides an image as a query for search, many systems will attempt to return images based on the objects in the image, and not based on the background of the image. In some use cases, such as image compositing, a user may want to find images with similar backgrounds without considering foreground object(s). Accordingly, there is a need in the art for systems and methods to generate object-agnostic representations of images.

SUMMARY

The present disclosure describes systems and methods for image processing, including generating object-agnostic image representations. Embodiments of the present disclosure include an image processing apparatus configured to receive a training image with a background, remove a foreground element from the training image, inpaint the space originally occupied by the foreground element, and train a machine learning model based on the training image and the inpainted version. In this way, the image processing apparatus according to embodiments is trained to encode both the original training image and the inpainted training image into similar representations.

Some embodiments of the image processing apparatus are trained based on a contrastive learning loss. Some embodiments of the image processing apparatus augment both the original training image and the inpainted training image to form a positive sample pair, and use the original training image along with another training image with a different background as a negative sample pair. Embodiments are then trained to encode the positive sample pair to have similar representations, and the negative sample pair to have dissimilar representations.

A method, apparatus, non-transitory computer readable medium, and system for generating object-agnostic image representations are described. One or more aspects of the method, apparatus, non-transitory computer readable medium, and system include receiving a training image including a first element and a second element; removing the first element from the training image to obtain a modified training image; inpainting a portion of the modified training image corresponding to the first element to obtain an inpainted training image; encoding the training image and the inpainted training image using a machine learning model to obtain an encoded training image and an encoded inpainted training image; and updating parameters of the machine learning model based on the encoded training image and the encoded inpainted training image.

A method, apparatus, non-transitory computer readable medium, and system for generating object-agnostic image representations are described. One or more aspects of the method, apparatus, non-transitory computer readable medium, and system include receiving a query image comprising a background; encoding the query image using a machine learning model to obtain an image representation, wherein the machine learning model is trained to encode a background scene based on an image pair comprising an original image and a modified version of the original image with a foreground object removed; and retrieving a result image based on the image representation, wherein the result image comprises a matching background similar to the background of the query image.

An apparatus, system, and method for generating object-agnostic image representations are described. One or more aspects of the apparatus, system, and method include an object detection component configured to detect a foreground object of an image; an inpainting component configured to inpaint a portion of the image corresponding to the foreground object to obtain an inpainted image; and a machine learning model configured to encode the inpainted image to obtain an image representation that represents a background scene of the image, wherein the machine learning model is trained based on the image and the inpainted image.

DETAILED DESCRIPTION

Figure 1:
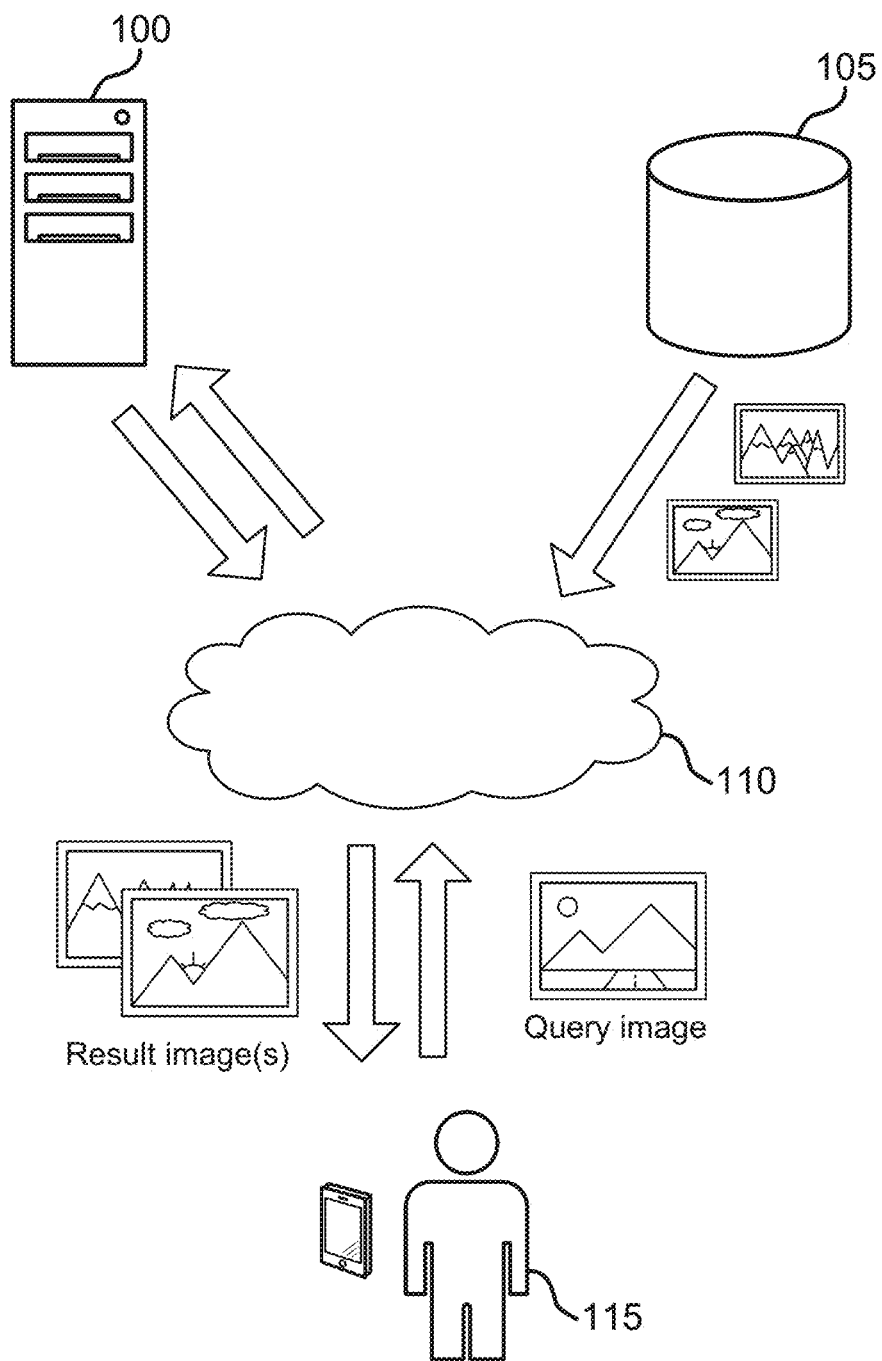
FIG. 1 shows an example of an image processing system according to aspects of the present disclosure.

The present disclosure relates to image representation. Image representation involves transforming image data into a different form, such as a vector representation that encodes semantic information about the image. Different image representation techniques can be used for different tasks. For example, semantic image representation can be used to produce image features that correspond to natural language queries.

Semantic image representation involves developing a vocabulary of visual concepts. Images are then encoded by a neural network, such as a convolutional neural network (CNN) combined with appearance classifier layers into a vector output. The output is referred to as a semantic multinomial, and can be interpreted as the dimensions of a semantic space. Semantic image representation learning is used to develop models for applications such as visual search and visual recommendations. In many cases, these applications require a global semantic representation of an image which is then used to search for nearest neighbors across the search space.

A variety of techniques may be used for image representation. For example, deep learning based approaches such as ResNets and transformer-based approaches can be used to encode and transform images for further processing. In another example, a model can be trained to recognize objects by taking various views of the same object as positive samples, and other images that do not contain the object as negative samples. Yet other models use a momentum encoder with a queue of past training samples to provide a large number of negative samples while increasing memory efficiency as a result of requiring a smaller batch size.

Conventional image representation approaches typically focus on encoding content in images that corresponds to objects in the images. Generating representations focused on salient objects is useful in many contexts. In some cases, however, a user may be more interested in the background of the image. Conventional image representation systems are not capable of accurately encoding background content.

Embodiments of the present disclosure are able to learn representations of images that encode information about the background, In some cases, the representation is agnostic to salient objects in the image. This is useful for image editing use-cases, such as when a user wants to compose an image with multiple sources. For example, a user might want to find a background from one image and foreground objects from another image. Accordingly, there is a need for systems and methods to find backgrounds from a set of images, such as from a database. Embodiments disclosed herein include methods for generating training data and models trained on the training data. Some embodiments include a machine learning model configured to encode an image to produce a representation that de-emphasizes foreground objects. Some embodiments include multiple neural networks, including the encoding models and classifier models that can be used for labeling the training data.

According to some aspects of the present disclosure, a system receives a training image including a first element and a second element, removes the first element from the training image to obtain a modified training image, inpaints a portion of the modified training image corresponding to the first element to obtain an inpainted training image, encodes the training image and the inpainted training image using a machine learning model to obtain an encoded training image and an encoded inpainted training image, and updates parameters of the machine learning model based on the encoded training image and the encoded inpainted training image.

Accordingly, embodiments train the machine learning model to encode the training image and the inpainted training image into similar object-agnostic representations. This produces a model that is able to receive a query image containing one or more foreground objects and a background, and return images with similar backgrounds and not necessarily similar foreground objects.

An embodiment of the present disclosure is used for image compositing. In an example, a user wishes to create a detailed forest scene. The user may have foreground objects from multiple sources already selected, and wish to expand the background of the forest to include texture or additional detail. The user can input a query image into the system, and find result images with a similar forest background. Then, the user can use background elements from the result images to composite into his or her project.

Figure 6:
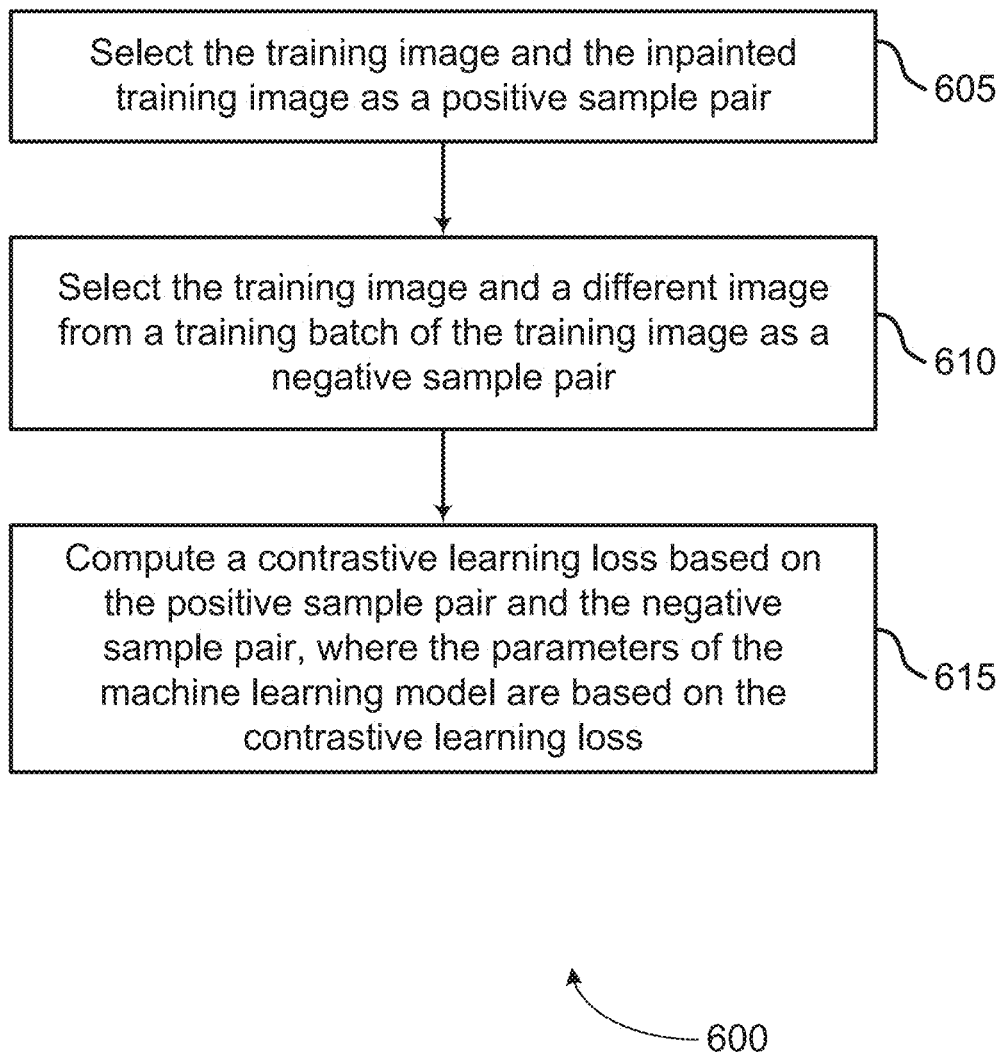
FIG. 6 shows an example of a method for training a machine learning model according to aspects of the present disclosure.
Figure 7:
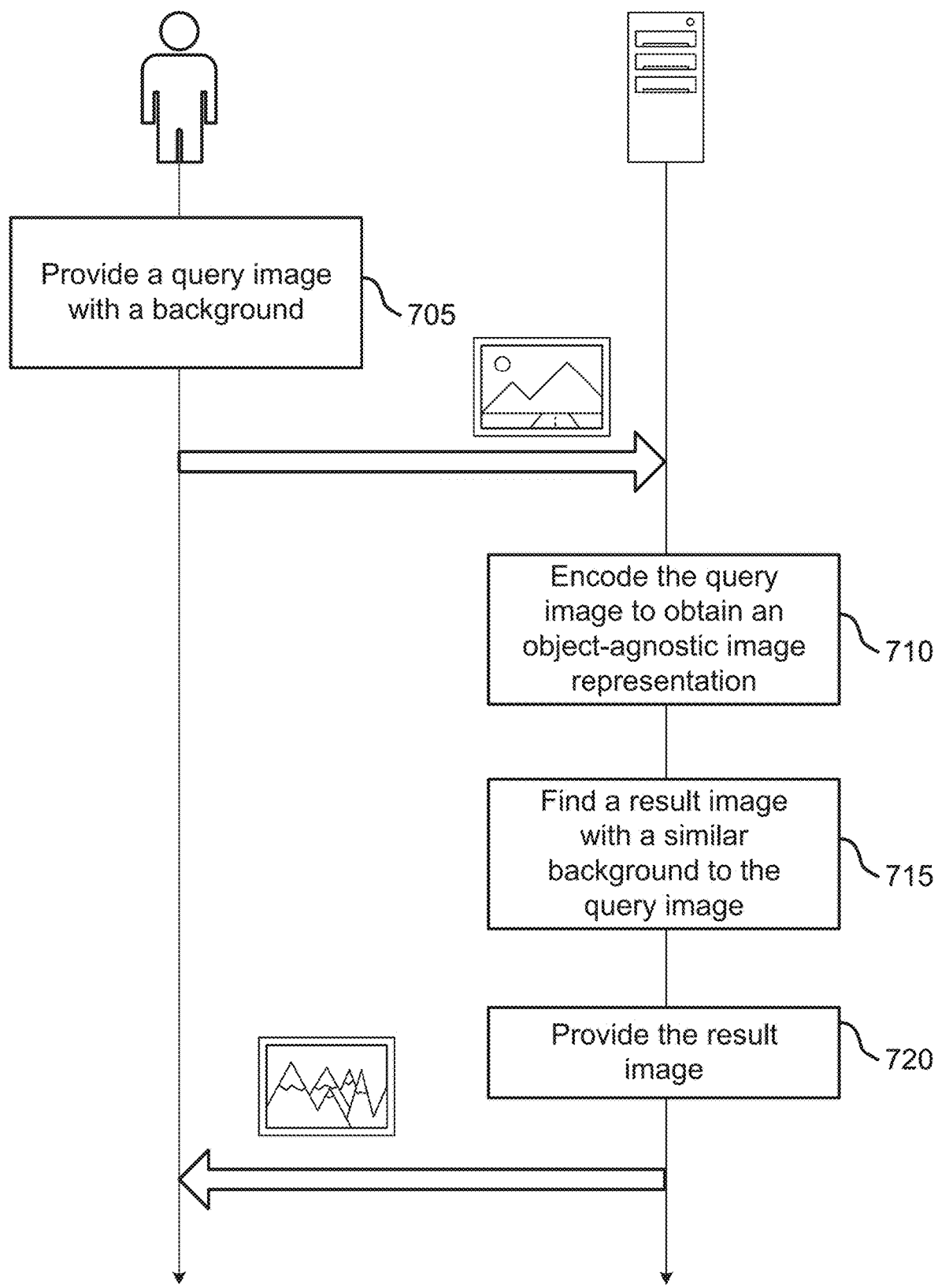
FIG. 7 shows an example of finding an image with a similar background to a query image according to aspects of the present disclosure.

Example applications of the present disclosure in the image compositing context are provided with reference to FIGS. 1 and 7. Details regarding the architecture of an image processing system and apparatus are provided with reference to FIGS. 1-2. Examples of processes for data generation and training the machine learning model are described with reference to FIGS. 3-6. Examples of downstream applications of the models, including image search, are described with reference to FIGS. 7-9.

Image Processing System

A system and apparatus for generating object-agnostic image representations is described with reference to FIGS. 1-2. One or more aspects of the system and apparatus include an object detection component configured to detect a foreground object of an image; an inpainting component configured to inpaint a portion of the image corresponding to the foreground object to obtain an inpainted image; and a machine learning model configured to encode the inpainted image to obtain an image representation that represents a background scene of the image, wherein the machine learning model is trained based on the image and the inpainted image. Some examples further include a search component configured to retrieve a result image based on the image representation, wherein the result image comprises a matching background similar to the background of the query image.

Some examples of the system and apparatus further include a user interface configured to receive a query image comprising a background. Some examples further include a training component configured to train the machine learning model based on a contrastive learning loss. In some aspects, the machine learning model comprises a transformer model with at least one self-attention layer.

Some examples of the system and apparatus further include a data collection component configured to retrieve training images based on a masked language model (MLM). For example, some embodiments are configured to generate expanded queries using the masked language model and to retrieve training images based on the expanded queries.

FIG. 1 shows an example of an image processing system according to aspects of the present disclosure. The example shown includes image processing apparatus 100, database 105, network 110, and user 115.

Referring to FIG. 1, in one example, user 115 provides a query image to image processing apparatus 100. User 115 may upload or select the query image using a user interface of image processing apparatus 100 as described with reference to FIG. 2. In at least one embodiment, user 115 selects the query image from database 105. Image processing apparatus 100 then encodes the query image into an object-agnostic representation and finds images that include backgrounds that are similar to a background included in the query image. Image processing apparatus 100 then provides the image to user 115, for example, through network 110.

In some examples, database 105 holds a plurality of images, including result images that have similar backgrounds to a query image. A database is an organized collection of data. In an example, database 105 stores data in a specified format known as a schema. Database 105 may be structured as a single database, a distributed database, multiple distributed databases, or an emergency backup database. In some cases, a database controller may manage data storage and processing in database 105. In some cases, user 115 interacts with the database controller. In other cases, the database controller may operate automatically without interaction from user 115.

In at least one embodiment, image processing apparatus 100 is implemented on a local machine, such as a personal computer of user 115. In some embodiments, image processing apparatus 100 is implemented as a server. A server provides one or more functions to user devices (e.g., a user device of user 115) linked by way of one or more of networks, such as network 110. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

According to some aspects, image processing apparatus 100 receives a training image including a first element and a second element. In some aspects, image processing apparatus 100 receives a query image including a background. Image processing apparatus 100 is an example of, or includes aspects of, the corresponding element described with reference to FIG. 2. Further detail regarding the architecture of image processing apparatus 100 is provided with reference to FIG. 2. Further detail regarding processes for data generation and training a machine learning model are described with reference to FIGS. 3-6. Further detail regarding a process for image searching are described with reference to FIGS. 7-9.

According to some aspects, image processing apparatus 100 is linked through a network, such as network 110. Network 110 may be referred to as a "cloud." A cloud is a computer network configured to provide on-demand availability of computer system resources, such as data storage and computing power. In some examples, the cloud provides resources without active management by user 115. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network 110 comprising multiple edge routers and core routers. In another example, a cloud is based on a local collection of switches in a single physical location.

Figure 2:
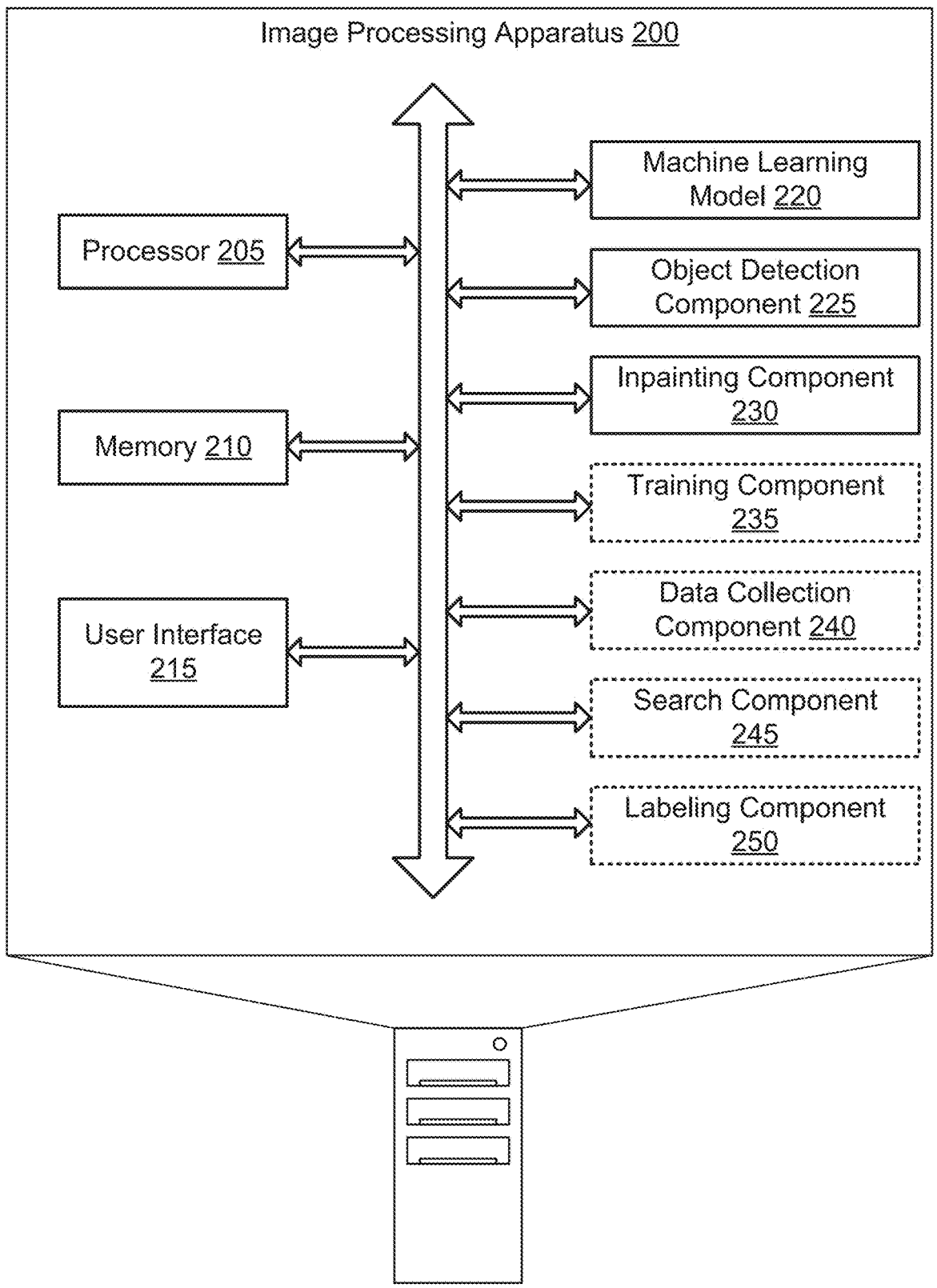
FIG. 2 shows an example of an image processing apparatus according to aspects of the present disclosure.

FIG. 2 shows an example of an image processing apparatus according to aspects of the present disclosure. The example shown includes image processing apparatus 200, processor unit 205, memory unit 210, user interface 215, machine learning model 220, object detection component 225, inpainting component 230, training component 235, data collection component 240, search component 245, and labeling component 250. Image processing apparatus 200 is an example of, or includes aspects of, the corresponding element described with reference to FIG. 1.

Processor unit 205 includes one or more processors. A processor is an intelligent hardware device, e.g., a general-purpose processing component, a digital signal processor 205 (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof. In some cases, processor unit 205 is configured to operate a memory array using a memory controller. In other cases, a memory controller is integrated into processor unit 205. In some cases, processor unit 205 is configured to execute computer-readable instructions stored in memory of memory unit 210 to perform various functions. In some embodiments, processor unit 205 includes special purpose components for modem processing, baseband processing, digital signal processing, or transmission processing.

In some examples, memory unit 210 includes one or more memory devices that store images used in the operation of image processing apparatus 200, such as query images, training images, and result images. Examples of a memory device include random access memory (RAM), read-only memory (ROM), spinning hard disk drives, and solid state drives. In some examples, memory unit 210 stores computer-readable, computer-executable software including instructions that, when executed, cause processor unit 205 to perform various functions described herein. In some cases, memory unit 210 contains, among other things, a basic input/output system (BIOS) which controls basic hardware or software operation such as the interaction with peripheral components or devices. In some cases, a memory controller operates memory cells of memory unit 210. For example, the memory controller can include a row decoder, column decoder, or both. In some cases, memory cells within memory unit 210 store information in the form of a logical state.

According to some aspects, user interface 215 enables a user to interact with a device. In some embodiments, user interface 215 includes an audio device, such as an external speaker system, an external display device such as a display screen, or an input device (e.g., remote control device interfaced with user interface 215 directly or through an IO controller module). According to some aspects, user interface 215 is configured to receive a query image comprising a background. According to some aspects, user interface 215 displays a set of result images in response to the query. In some cases, a user interface 215 is a graphical user interface (GUI).

According to some aspects, user interface 215 further includes an IO controller. In some embodiments, the IO controller manages input and output signals for a device. In some embodiments, the IO controller manages peripherals that are not integrated into the device. In some cases, the IO controller represents a physical connection or port to an external peripheral. In some cases, the IO controller utilizes an operating system such as iOS®, ANDROID®, MS-DOS®, MS-WINDOWS @, OS/2®, UNIX®, LINUX®, or another known operating system. In some cases, the IO controller represents or interacts with a modem, a keyboard, a mouse, a touchscreen, or a similar device. In some cases, the IO controller is implemented in processor unit 205. In some cases, a user interacts with a device via the IO controller or via hardware components controlled by the IO controller.

According to some aspects, machine learning model 220 is implemented as a neural network. A neural network is a type of computer algorithm that is capable of learning specific patterns without being explicitly programmed, but through iterations over known data. A neural network may refer to a cognitive model that includes input nodes, hidden nodes, and output nodes. Nodes in the network may have an activation function that computes whether the node is activated based on the output of previous nodes. Training the system may involve supplying values for the inputs, and modifying edge weights and activation functions (algorithmically or randomly) until the result closely approximates a set of desired outputs. Some examples of machine learning model 220 include a vision transformer network. In some aspects, the machine learning model 220 includes a transformer model with at least one self-attention layer.

In some cases, there is more unlabeled data available than labeled data, and so self-supervised learning approaches may be used. One way to implement self-supervised learning is to use a technique called "contrastive learning." In this technique, some data is taken as positive samples, and other data can be generated that does not include a target attribute and taken as a negative sample. Predicted values for positive and negative samples can be used to generate a contrastive learning loss.

Some examples of machine learning model 220 are trained to encode a background scene based on an image pair including an original image and a modified version of the original image with a foreground object removed. According to some aspects, machine learning model 220 encodes a training image and an inpainted training image to obtain an encoded training image and an encoded inpainted training image, and is trained based on the encoded training image and the encoded inpainted training image. Machine learning model 220 is implemented as software, as firmware, as one or more hardware circuits, or as a combination thereof. Machine learning model 220 is an example of, or includes aspects of, the corresponding element described with reference to FIG. 3.

According to some aspects, object detection component 225 is configured to perform image segmentation around objects in an image. In digital image processing and computer vision, image segmentation is the process of partitioning a digital image into multiple segments (sets of pixels, also known as image objects). The goal of segmentation is to simplify and/or change the representation of an image into something that is more meaningful and easier to analyze. Image segmentation is typically used to locate objects and boundaries (lines, curves, etc.) in images. More precisely, image segmentation is the process of assigning a label to every pixel in an image such that pixels with the same label share certain characteristics.

Object detection refers to a computer-implemented program to classify objects using categorical labels and localize objects present in input images. Object detection can be performed and evaluated by mean average precision, a metric taking into account a quality of classification and localization. In some examples, computer vision applications perform object detection to analyze image data, e.g., to identify people or objects in an image.

According to some aspects, object detection component 225 removes the first element from the training image to obtain a modified training image. In some aspects, the first element includes a foreground element and the second element includes a background element. In some examples, object detection component 225 performs object detection on the training image to obtain an object mask corresponding to the first element, where the first element is removed based on the object mask. In some examples, object detection component 225 expands the object mask to include a boundary region of the first element, where the first element is removed based on the expanded object mask. Object detection component 225 is implemented as software, as firmware, as one or more hardware circuits, or as a combination thereof. Object detection component 225 is an example of, or includes aspects of, the corresponding element described with reference to FIG. 3.

According to some aspects, inpainting component 230 inpaints a portion of the modified training image corresponding to the first element to obtain an inpainted training image. Inpainting is a task of reconstructing missing regions in an image. In some embodiments, when object detection component 225 generates a mask over foreground object(s) in an image, inpainting component 230 treats the masks as missing regions and inpaint over the masks. Inpainting component 230 is implemented as software, as firmware, as one or more hardware circuits, or as a combination thereof. Inpainting component 230 is an example of, or includes aspects of, the corresponding element described with reference to FIG. 3.

According to some aspects, training component 235 updates parameters of the machine learning model 220 based on the encoded training image and the encoded inpainted training image. In some examples, training component 235 updates the parameters of machine learning model 220 to train machine learning model 220 to represent a background element and to de-emphasize a foreground element.

In some examples, training component 235 selects the training image and the inpainted image as a positive sample pair. In some examples, training component 235 selects the training image and a different image from a training batch of the training image as a negative sample pair. In some examples, training component 235 computes a contrastive learning loss based on the positive sample pair and the negative sample pair, where the parameters of the machine learning model 220 are based on the contrastive learning loss.

Contrastive learning refers to a type of machine learning in which a model is trained using the selection of positive and negative sample pairs. Contrastive learning can be used in either a supervised or unsupervised (e.g., self-supervised) training context. A loss function for a contrastive learning model can encourage a model to generate similar results for positive sample pairs, and dissimilar results for negative sample pairs.

In some examples, training component 235 augments the training image to obtain an augmented training image. In some examples, training component 235 augments the inpainted training image to obtain an augmented inpainted training image, where the encoded training image and the encoded inpainted training image are based on the augmented training image and the augmented inpainted training image, respectively.

In some examples, training component 235 identifies a threshold size. In some examples, training component 235 determines that the first element is less than the threshold size. In some examples, training component 235 selects the training image for training machine learning model 220 based on the determination. The threshold size may be a ratio between the size of the first element and the size of the entire image. In one example, the threshold ratio is 0.25.

Training component 235 is implemented as software, as firmware, as one or more hardware circuits, or as a combination thereof. According to some aspects, training component 235 is omitted from image processing apparatus 200 and is included in an external device. In this case, the external device uses training component 235 to update machine learning model 220 as described with reference to FIGS. 3-10. Training component 235 is an example of, or includes aspects of, the corresponding element described with reference to FIG. 3.

According to some aspects, data collection component 240 identifies a training query related to the second element. In some examples, data collection component 240 retrieves the training image based on the training query. According to some aspects, data collection component 240 is configured to retrieve training images based on a masked language model (MLM). For example, some examples of data collection component 240 receive an initial set of queries, and then expand the queries to include more information based off of the MLM. In some examples, the MLM of data collection component 240 retrieves the top 10 expansions, and one or more training queries are based on the top 10 expansions. In some examples, the MLM is used iteratively or recursively to expand the expansions. Data collection component 240 is implemented as software, as firmware, as one or more hardware circuits, or as a combination thereof. According to some aspects, data collection component 240 is omitted from image processing apparatus 200 and is included in an external device. For example, the external device may generate queries, find result images corresponding to the queries, and select training images from the result images.

Some examples of search component 245 are configured to retrieve images similar to a query image. According to some aspects, search component 245 retrieves a result image based on an image representation of the query image, where the result image includes a matching background similar to the background of the query image. In some examples, search component 245 compares the image representation of the query image to the metadata of each of the set of images, where the result image is retrieved based on the comparison. In some examples, search component 245 retrieves a set of result images based on the image representation. Search component 245 is implemented as software, as firmware, as one or more hardware circuits, or as a combination thereof. According to some aspects, search component 245 is omitted from image processing apparatus 200 and is included in an external device. In one example, search component 245 receives representation data or metadata from image processing apparatus 200, and searches for result images based on the received data.

According to some aspects, labeling component 250 generates metadata for each of the set of images based on a corresponding image representation of the set of image representations, where the result image is retrieved by search component 245 based on the metadata. In some examples, labeling component 250 includes a neural network that implements semantic multinomial representation of images. In some cases, the metadata for each image in the set of images is generated according to a semantic multinomial output. Labeling component 250 is implemented as software, as firmware, as one or more hardware circuits, or as a combination thereof. According to some aspects, labeling component 250 is omitted from image processing apparatus 200 and is included in an external device. In one example, labeling component 250 receives representation data from image processing apparatus 200 and generates metadata based on the received representation data.

Training and Data Generation

Some embodiments of the present disclosure provide methods for generating training data for a machine learning model. In some embodiments, the training data is used in a contrastive learning scheme to teach the model to similarly represent images with matching backgrounds, agnostic of any objects included in the foreground of the images.

A method for generating object-agnostic image representations is described with reference to FIGS. 3-6. One or more aspects of the method include receiving a training image including a first element and a second element; removing the first element from the training image to obtain a modified training image; inpainting a portion of the modified training image corresponding to the first element to obtain an inpainted training image; encoding the training image and the inpainted training image using a machine learning model to obtain an encoded training image and an encoded inpainted training image; and updating parameters of the machine learning model based on the encoded training image and the encoded inpainted training image.

In some aspects, the first element comprises a foreground element and the second element comprises a background element. Some examples of the method further include iteratively updating the parameters of the machine learning model to train the machine learning model to represent the second element and to de-emphasize the first element.

Some examples of the method further include selecting the training image and the inpainted image as a positive sample pair. Some examples further include selecting the training image and a different image from a training batch of the training image as a negative sample pair. Some examples further include computing a contrastive learning loss based on the positive sample pair and the negative sample pair, wherein the parameters of the machine learning model are based on the contrastive learning loss.

Some examples of the method further include augmenting the training image to obtain an augmented training image. Some examples further include augmenting the inpainted training image to obtain an augmented inpainted training image, wherein the encoded training image and the encoded inpainted training image are based on the augmented training image and the augmented inpainted training image, respectively.

Some examples of the method further include performing object detection on the training image to obtain an object mask corresponding to the first element, wherein the first element is removed based on the object mask. Some examples of the method further include expanding the object mask to include a boundary region of the first element, wherein the first element is removed based on the expanded object mask.

Some examples of the method further include identifying a training query related to the second element. Some examples further include retrieving the training image based on the training query. Some examples of the method further include identifying a threshold size. Some examples further include determining that the first element is less than the threshold size. Some examples further include selecting the training image for training the machine learning model based on the determination.

Figure 3:
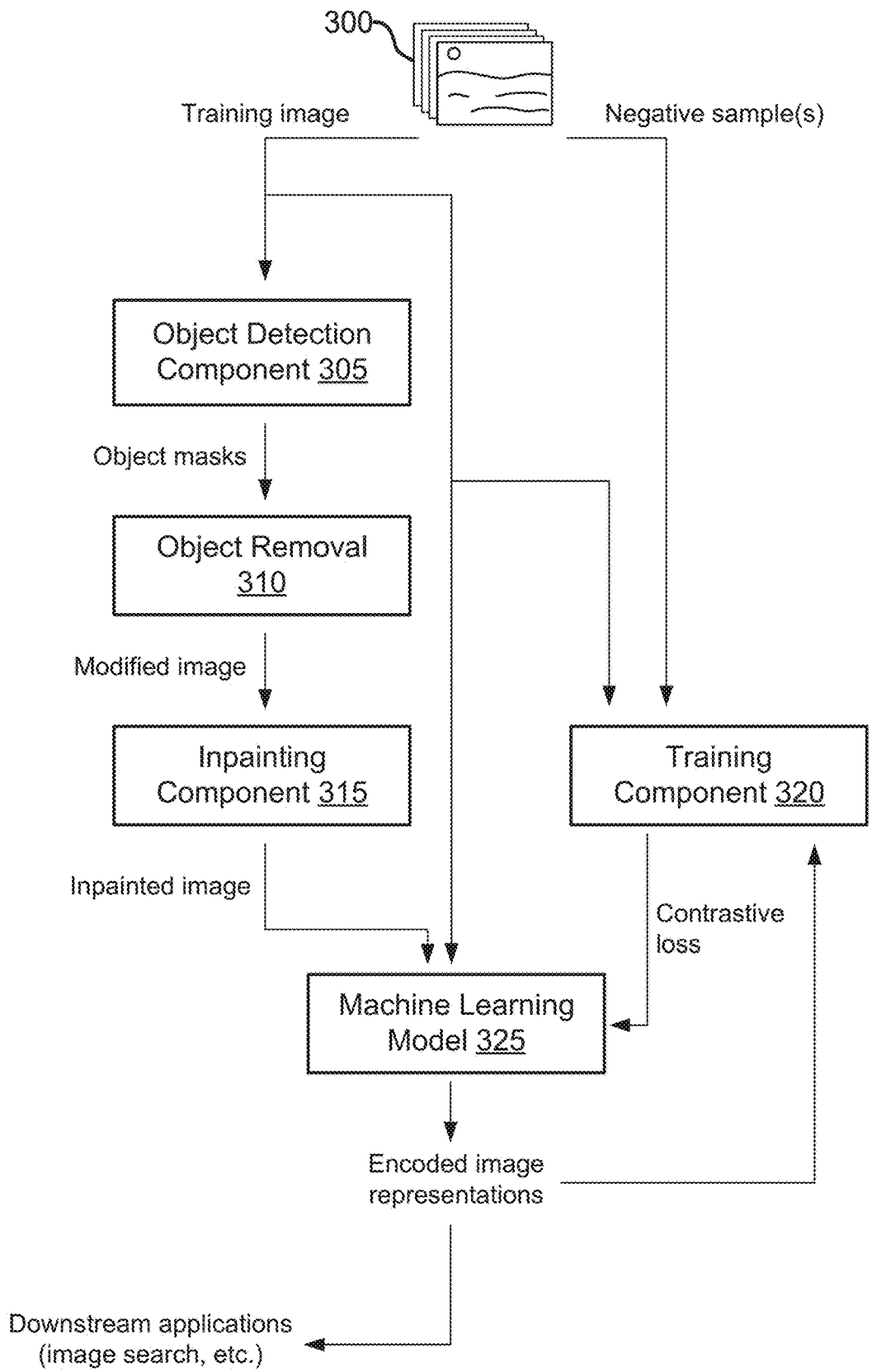
FIG. 3 shows an example of training data generation according to aspects of the present disclosure.

FIG. 3 shows an example of training data generation according to aspects of the present disclosure. The example shown includes training images 300, object detection component 305, combination and expansion 310, inpainting component 315, training component 320, and machine learning model 325. Object detection component 305 is an example of, or includes aspects of, the corresponding element described with reference to FIG. 2. Inpainting component 315 is an example of, or includes aspects of, the corresponding element described with reference to FIG. 2. Training component 320 is an example of, or includes aspects of, the corresponding element described with reference to FIG. 2. Machine learning model 325 is an example of, or includes aspects of, the corresponding element described with reference to FIG. 2.

Referring to FIG. 3, machine learning model 325 is trained for object-agnostic image representation. According to some aspects, input images 300 are selected for data generation. In one example, keyphrases are chosen according to a diverse set of backgrounds. Then, a masked language model (MLM) is used to expand the keyphrases to form queries. Then, the queries are input to an image search algorithm to obtain an image set containing the query backgrounds and foreground objects, e.g. input images 300. In some cases, these operations are performed by a data collection component as described with reference to FIG. 2.

According to some aspects, training data is generated from input images 300. In some embodiments, the training data includes a training image from input images 300 paired with a corresponding inpainted image. The corresponding inpainted image includes a same background as a corresponding training image included in input images 300, omits a foreground object included in the training image, and includes an inpainted portion that is related to the background and is disposed in the area of the inpainted image corresponding of the omitted foreground object.

According to some aspects, to generate the training data, object detection component 305 obtains a modified training image by performing object detection on the training image. In an example, object detection component 305 performs one or more image segmentation operations on the training image to generate one or more object masks. The object masks surround the one or more foreground objects of the training image and remove the one or more foreground objects with the one or more object masks to produce the modified training image.

In some cases, the one or more object masks are combined to form a combined mask including all objects that are detected in the training image. For example, object removal operations 310 may be performed on multiple segmentation masks to generate a combined mask. In some embodiments, object detection component 305 expands the combined mask to include object boundaries or shadows. In some embodiments, object detection component 305 obtains the modified training image by removing the detected objects according to the combined mask.

According to some aspects, inpainting component 315 obtains an inpainted image by performing an inpainting algorithm on the modified training image. Inpainting is an image processing task that involves filling in missing regions of an image. Inpainting techniques use surrounding information to attempt to fill in a masked region. Some inpainting models use convolutional networks with various filter sizes in order to borrow info nation from distant spatial locations. Recent advances have enabled data-driven and deep learning-based i fitting that generate missing pixels with global consistency and fine textures. Some examples of inpainting include GMCNN, EdgeConnect, and LaMa ("Large Mask") inpainting.

In some embodiments, inpainting component 315 uses a pre-trained inpainting model to generate data for the masked region of the modified training image and to generate the inpainted image including the data for the masked region.

In some embodiments, inpainting component 315 calculates a ratio between the area of the combined mask and the total image area of the modified training image. In some cases, if this ratio is greater than a predetermined value, the corresponding training image is considered to be unsuitable for inpainting and is filtered out from a set of image pairs.

In some embodiments, the predetermined value is 0.25. According to some aspects, a training image and a corresponding inpainted image that is not filtered out is retained as an image pair in the set of image pairs for training machine learning model 325.

In some embodiments, once the set of image pairs is generated, training component 320 uses a contrasting training method to train machine learning model 325 using the set of image pairs. In some cases, training component 320 uses a modified MoCov3 framework for training machine learning model 325. In an example, instead of augmenting a same image twice to produce two views of a positive sample, the modified MoCov3 framework augments each image of an image pair as positive sample inputs to the training component. In some embodiments, training component 320 uses a training image of an image pair and a different image chosen from input images 300 as negative sample inputs. Then, training component 320 trains machine learning model 325 using the inputs based on a contrastive learning loss. In some embodiments, an inpainted image and a training image of an image pair are used as a positive sample without applying augmentations thereto. In some embodiments, machine learning model 325 includes a vision transformer.

Some embodiments of machine learning model 325 use a linear scaling rule for a learning rate lr according to lr×BatchSize/256. In some embodiments, the base learning rate lr is 7.5e-5. According to some aspects, machine learning model 325 is trained with an optimizer using a total batch size of 8192. In some embodiments, multiple machine learning models are trained for 300 epochs, and the machine learning model with the lowest validation loss is selected as a product or final encoding model, i.e., machine learning model 325 or machine learning model 220 as described with reference to FIG. 2.

Some embodiments use additional deep-learning models to implement object detection component 305, inpainting component 315, or various other components such as the ones described with reference to FIG. 2. Some embodiments of the image processing apparatus train one or more of these deep-learning models in an end-to-end manner. Other embodiments train one or more components in different phases. Some embodiments utilize pre-trained models for components, such as a pre-trained convolutional model in object detection component 305 or inpainting component 315.

Figure 4:
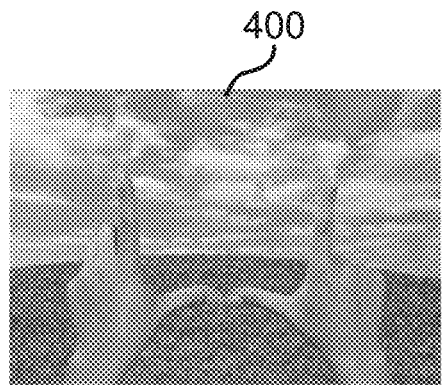
FIG. 4 shows an example of training data image pairs according to aspects of the present disclosure.
Figure 4:
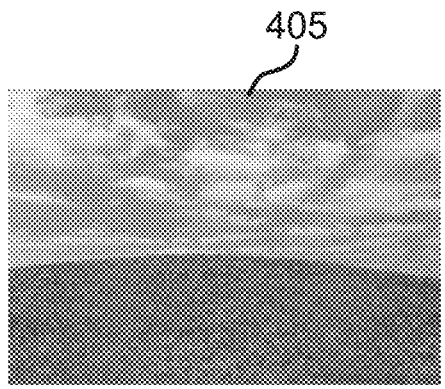
Figure 4:
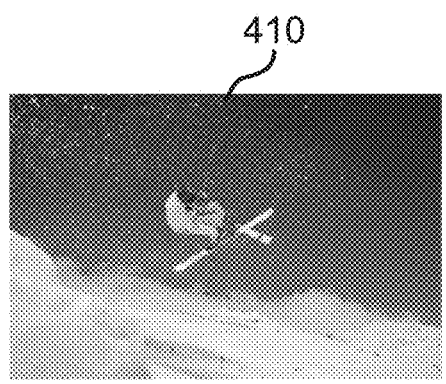
Figure 4:
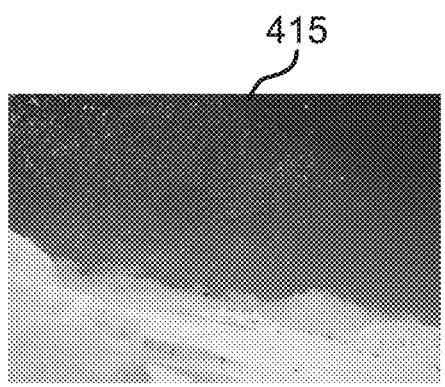

FIG. 4 shows an example of training data image pairs according to aspects of the present disclosure. The example shown includes first original image 400, first inpainted image 405, second original image 410, and second inpainted image 415.

First original image 400 illustrates a background including a grassy field and a cloudy sky, and additionally includes a foreground object including human hands. In some embodiments, an image processing apparatus applies object detection and inpainting to first original image 400 to generate a first modified training image in which the foreground object is removed and to generate first inpainted image 405 based on the first modified training image. First inpainted image 405 is similar to first original image 400, except in that the foreground objects, i.e. the hands, are replaced by a prediction of the region corresponding to the foreground object.

Similarly, second original image 410 illustrates a background including snowy hills and a sky, and additionally includes a foreground object including a skier. The image processing apparatus performs object detection and inpainting to generate second inpainted image 415.

The first original image 400 and the first inpainted image 405 form a first positive sample pair that can be used to train the image processing apparatus. Similarly, second original image 410 and second inpainted image 415 form a second positive sample pair. Once trained, an image processing apparatus as described with reference to FIGS. 1 and 2 is able to generate similar representations for images with the same or similar backgrounds, agnostic of any foreground objects. For example, once trained, the image processing apparatus can generate a similar representation based on either second original image 410 or second inpainted image 415.

Figure 5:
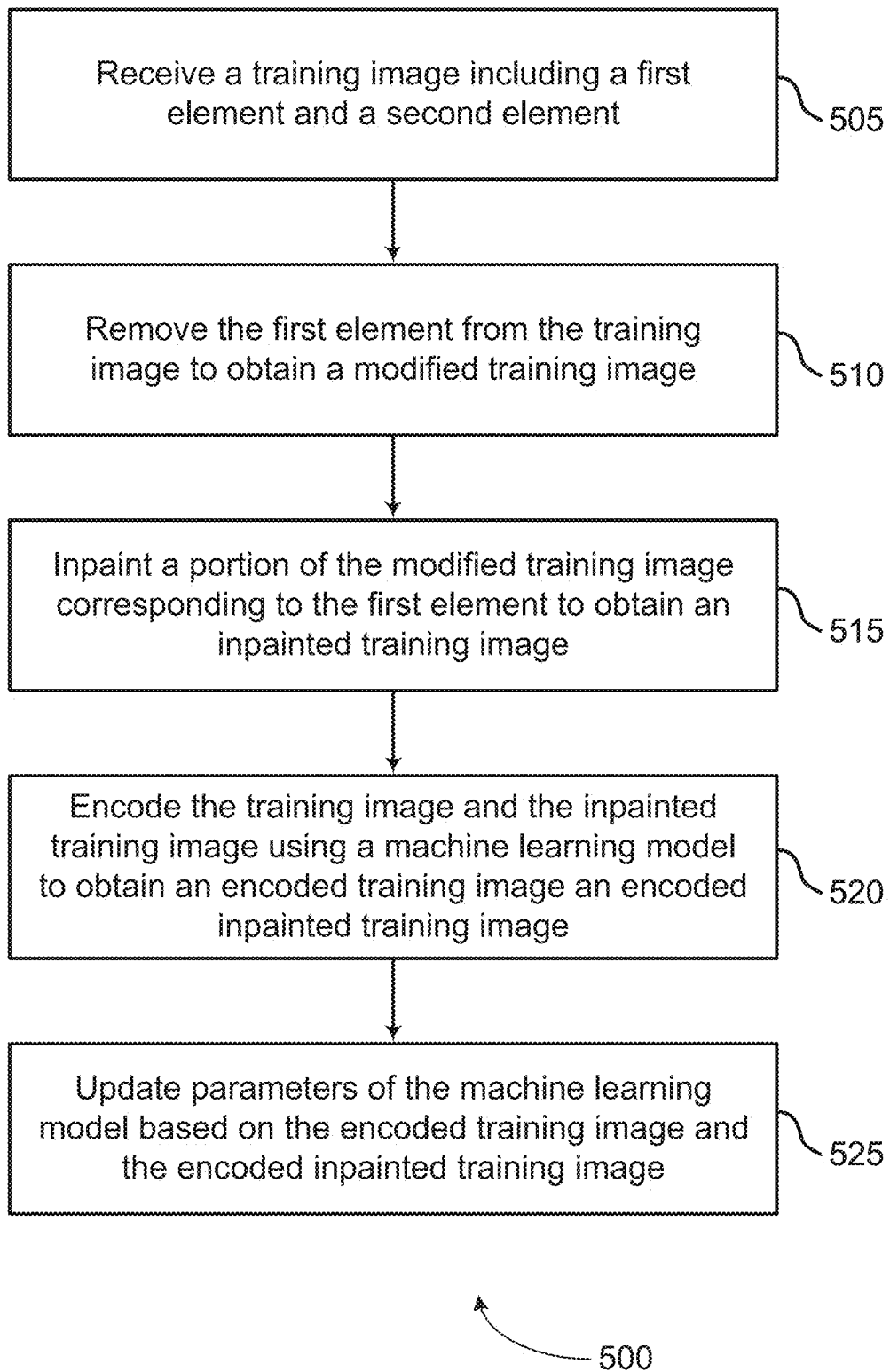
FIG. 5 shows an example of a method for image processing according to aspects of the present disclosure.

FIG. 5 shows an example of a method 500 for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations. Further detail regarding the image processing is described above with reference to FIG. 3.

Referring to FIG. 5, a system according to present embodiments is trained in a self-supervised manner from a training image. The system receives the training image, and then performs object detection to identify foreground objects within the training image. Then, masks encompassing the foreground objects are generated. In some cases, these masks are expanded in order to cover object boundaries. Then, the system inpaints the masked regions to generate an inpainted training image. The system is then trained based on the original training image and the inpainted image. In this way, the system learns to generate similar representations for images with similar backgrounds, agnostic of foreground objects.

At operation 505, the system receives a training image including a first element and a second element. In some cases, the operations of this step refer to, or may be performed by, an image processing apparatus as described with reference to FIGS. 1 and 2. In some embodiments, the training images are provided by a user. In some embodiments, the training images are provided from a training image dataset.

In some embodiments, the first element includes a foreground element and the second element includes a background element. For example, the first element may include a foreground element such as the hands illustrated from first original image 400 as described with reference to FIG. 4., and the second element may include a background element, such as the hills and sky from first original image 400 as described with reference to FIG. 4.

In some cases, the system identifies or determines a threshold size of the first element. In one example, the threshold size is based on a ratio between the size of the first element and the size of the entire image. In some embodiments, if the first element is less than the threshold size, the system selects the training image for training. In some cases, if the first element is greater than the threshold size, the system rejects the first training image. In at least one embodiment, the threshold size is the aforementioned ratio, and is 0.25. In some examples, these operations are performed by a training component as described with reference to FIGS. 2 and 3.

In some embodiments, the data collection component identifies a training query related to the second element and retrieves the training image based on the training query. For example, in some cases, a user provides a training query or an initial set of training queries, and the initial queries are expanded using a masked language model (MLM). For example, the MLM retrieves the top 10 expansions of the initial queries, and then the training queries are based on these expansions. In some examples, the MLM is used iteratively or recursively to expand the expansions, and the training queries are based on the expanded expansions.

At operation 510, the system removes the first element from the training image to obtain a modified training image. In some cases, the operations of this step refer to, or may be performed by, an object detection component as described with reference to FIGS. 2 and 3. In some embodiments, the object detection component performs object detection on the training image to obtain an object mask corresponding to the first element, where the first element is removed based on the object mask. For example, in some cases, removing the first element includes detecting the first element using image segmentation techniques, and masking over the first element.

In some cases, the object detection component generates a boundary mask that encompasses the first element. In some embodiments, the object detection component expands the boundary mask to include a boundary region of the first element, where the first element is removed based on the expanded object mask.

At operation 515, the system inpaints a portion of the modified training image corresponding to the first element to obtain an inpainted training image. In some cases, the operations of this step refer to, or may be performed by, an inpainting component as described with reference to FIGS. 2 and 3.

In some cases, inpainting the portion corresponding to the first element includes filling in a masked area with the inpainting component's prediction of the region. In some embodiments, the inpainting component includes a trained model configured to infer data in a region based on surrounding information.

In some embodiments, inpainting is performed according to a rule based or heuristic model. Inpainting is an image processing task that involves filling in missing regions of an image. Inpainting techniques use surrounding information to attempt to fill in a masked region. Some inpainting models use conventional networks with various filter sizes in order to borrow information from distant spatial locations. Recent advances have enabled data-driven and deep learning-based inpainting that generate missing pixels with global consistency and fine textures. Some examples of inpainting include GMCNN, Edge:Connect, and LaMa ("Large Mask") inpainting.

At operation 520, the system encodes the training image and the inpainted training image using a machine learning model to obtain an encoded training image and an encoded inpainted training image. In some cases, the operations of this step refer to, or may be performed by, a machine learning model as described with reference to FIGS. 2 and 3.

In an example, the machine learning model augments the training image to obtain an augmented training image and augments the inpainted training image to obtain an augmented training image, where the encoded training image and the encoded inpainted training image are based on the augmented training image and the augmented inpainted training image, respectively. For example, the machine learning model may encode the augmented training image and the augmented inpainted training image to generate the encoded training image and the encoded inpainted training image, respectively.

In some cases, augmentation operations are performed on the images before or during the encoding of the training image and the inpainted training image. Augmentation operations include various image processing operations such as color adjustment, luminance adjustment, brightness and contrast adjustment, and others. In some cases, augmentation operations include advanced operations such as object compositing, texture additions, blurring, and others.

At operation 525, the system updates parameters of the machine learning model based on the encoded training image and the encoded inpainted training image. In some cases, the operations of this step refer to, or may be performed by, a training component as described with reference to FIGS. 2 and 3. In some cases, the training component updates the parameters of the machine learning model as described with reference to FIG. 6.

For example, in some embodiments, the training component iteratively updates the parameters of the machine learning model to train the machine learning model to represent the second element and to de-emphasize the first element. For example, the training component may iteratively update the parameters of the machine learning model according to a contrastive learning loss.

FIG. 6 shows an example of a method 600 for training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system selects the training image and the inpainted training image as a positive sample pair. In some cases, the operations of this step refer to, or may be performed by, a training component as described with reference to FIGS. 2 and 3.

At operation 610, the system selects the training image and a different image from a training batch of the training image as a negative sample pair. In some cases, the operations of this step refer to, or may be performed by, a training component as described with reference to FIGS. 2 and 3.

At operation 615, the system computes a contrastive learning loss based on the positive sample pair and the negative sample pair, where the parameters of the machine learning model are based on the contrastive learning loss. In some cases, the operations of this step refer to, or may be performed by, a training component as described with reference to FIGS. 2 and 3. Contrastive learning is a self-supervised learning paradigm that allows a machine learning model such as a neural network to improve itself without using labeled data. Machine learning models which utilize contrastive learning use pairs of data points that are "similar" and pairs that are "different" in order to learn higher-level features about the data. Data points that are similar are known as positive pairs, and data points that are different are negative pairs. By treating the training image and the inpainted training image as a positive sample pair, the system learns to create similar representations for both images. Since the inpainted image has foreground objects removed, the system therefore learns to create similar representations for images with similar backgrounds, agnostic to any foreground objects.

Image Searching

A method for image searching is described with reference to FIGS. 7-9. One or more aspects of the method include receiving a query image comprising a background; encoding the query image using a machine learning model to obtain an image representation, wherein the machine learning model is trained to encode a background scene based on an image pair comprising an original image and a modified version of the original image with a foreground object removed; and retrieving a result image based on the image representation, wherein the result image comprises a matching background similar to the background of the query image.

Some examples of the method further include receiving a training image including the background scene and the foreground object. Some examples further include removing the foreground object from the image to obtain a modified training image. Some examples further include training the machine learning model based on the modified training image.

Some examples of the method further include encoding a plurality of images to obtain a plurality of image representations, wherein the plurality of images includes the result image. Some examples further include generating metadata for each of the plurality of images based on a corresponding image representation of the plurality of image representations, wherein the result image is retrieved based on the metadata.

Some examples of the method further include comparing the image representation of the query image to the metadata of each of the plurality of images, wherein the result image is retrieved based on the comparison. Some examples of the method further include retrieving a plurality of result images based on the image representation. Some examples further include displaying the plurality of result images in response to the query.

FIG. 7 shows an example of finding an image with a similar background to a query image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 7, a user may wish to find images with backgrounds that are similar to the background of a query image. In one example, the user provides the query image to the system. The user may upload the image through a user interface of a device, select a reference to the image, or otherwise indicate the query image for the system. Then, the system encodes the query image to obtain a representation that is agnostic to foreground objects in the query image. Then, the system finds images with similar backgrounds to the query image, and selects one of these images as a result image, and provides the result image to the user.

At operation 705, a user provides a query image with a background to the system. In the example illustrated, the query image includes a background with mountains in it.

At operation 710, the system encodes the query image to obtain an object-agnostic image representation. In some cases, the operations of this step refer to, or may be performed by, an image processing apparatus as described with reference to FIGS. 1 and 2. Some examples of the image processing apparatus include a vision transformer configured to generate the image representation. Some examples of the system include a convolutional neural network (CNN) to generate the image representation. Operations of the image processing apparatus are described in further detail with reference to FIG. 3.

At operation 715, the system finds a result image with a similar background to the query image. In some cases, the operations of this step refer to, or may be performed by, an image processing apparatus as described with reference to FIGS. 1 and 2. Further detail regarding obtaining the result image is provided with reference to FIG. 9.

At operation 820, the system provides the result image. In this case, the result image also contains mountains in the background. In some cases, the operations of this step refer to, or may be performed by, a user interface of the image processing apparatus as described with reference to FIG. 2.

Figure 8:
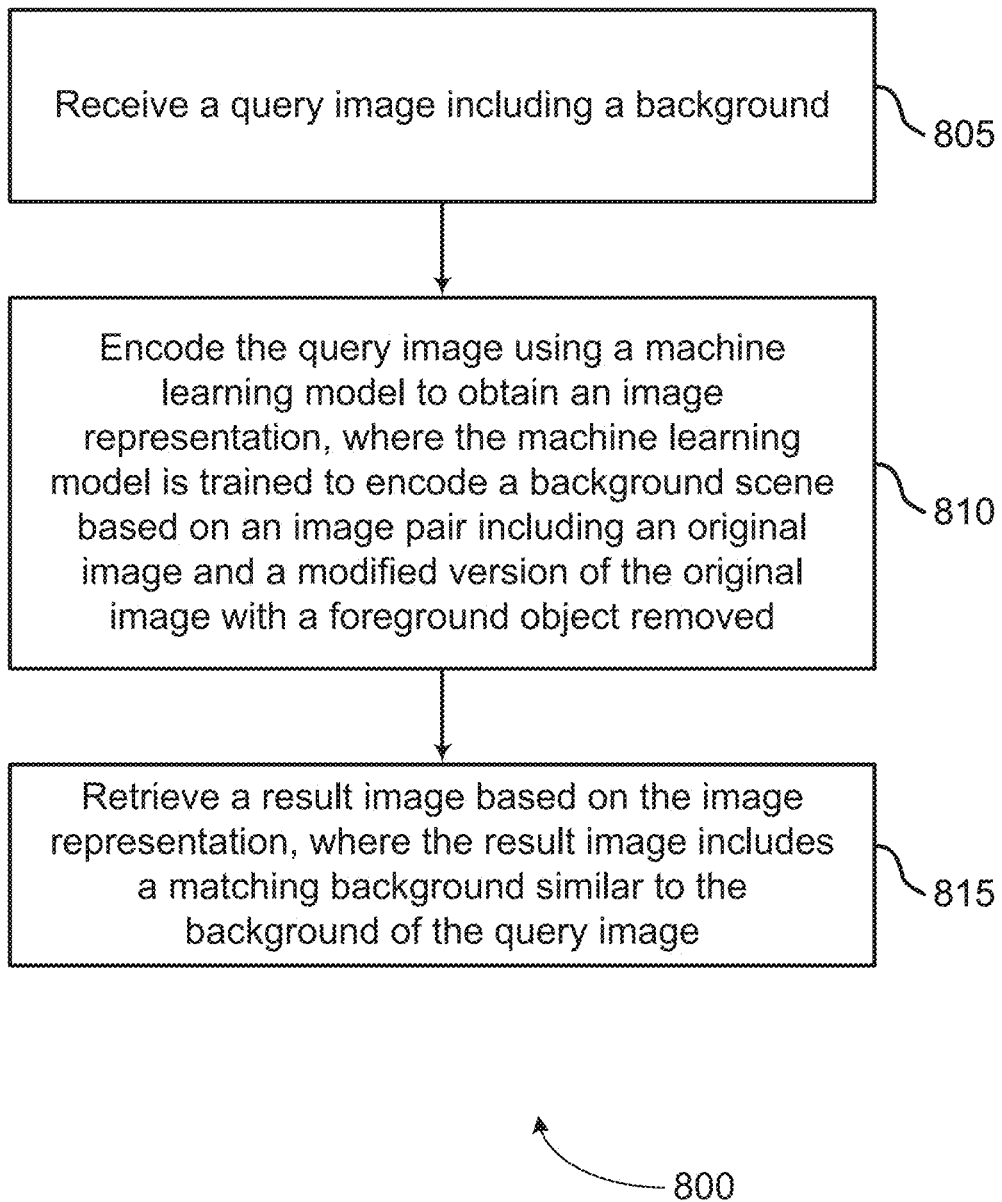
FIG. 8 shows an example of a method for finding images with similar backgrounds according to aspects of the present disclosure.

FIG. 8 shows an example of a method 800 for finding images with similar backgrounds according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 8, a user may provide a query image to find result images with a similar background to the query image. In an example, the user uploads or references the query image through a user interface to provide the query image to the system. Then, the system encodes the query image into a representation that encodes a background scene of the query image, and that is agnostic of foreground objects. Then, the system retrieves a result image that has a similar background to the query image, and provides it to the user.

At operation 805, the system receives a query image including a background. In some cases, the operations of this step refer to, or may be performed by, an image processing apparatus as described with reference to FIGS. 1 and 2. In one example, a user uploads the query image to the image processing apparatus or selects the query image using a user interface displayed by the image processing apparatus. In at least one embodiment, the user selects the query image from a database.

At operation 810, the system encodes the query image using a machine learning model to obtain an image representation, where the machine learning model is trained to encode a background scene based on an image pair including an original image and a modified version of the original image with a foreground object removed. In some cases, the operations of this step refer to, or may be performed by, a machine learning model as described with reference to FIGS. 2 and 3. Some examples of the machine learning model encode the query image using a vision transformer including at least one attention layer. Some examples of the machine learning model utilize a combined artificial neural network including transformer components and convolution components. In some embodiments, a training component trains the machine learning model to encode the background scene based on the image pair including the original image and the modified version of the original image with the foreground object removed as described with reference to FIGS. 5 and 6.

In some embodiments, the image processing apparatus receives a training image including the background scene and the foreground object as described with reference to FIG. 5. In some embodiments, an object detection component removes the foreground object from the image to obtain a modified training image as described with reference to FIG. 5. In some embodiments, the training component trains the machine learning model based on the modified training image as described with reference to FIGS. 5 and 6.

At operation 815, the system retrieves a result image based on the image representation, where the result image includes a matching background similar to the background of the query image. In some cases, the operations of this step refer to, or may be performed by, a search component as described with reference to FIG. 2. In an example, the search component retrieves the result image as described with reference to FIG. 9.

In another example, the system receives a text query including a background. The system may then encode the text query using a text encoder or transformer network. In some cases, the text query is encoded into a representation corresponding to the semantic space described above. Then, the system retrieves a result image based on this representation. For example, the system may calculate distances between the text query representation and representations of a plurality of images, and return a result image based on the calculations. In another example, the system calculates a distance between the text query and metadata of each image in a plurality of images. In some cases, the system embeds the text query and the image representation into the same space, such as a semantic space, in order to calculate a distance between the embeddings. The semantic space may include dimensions corresponding to a vocabulary of visual concepts, which in turn correspond to semantic labels.

Figure 9:
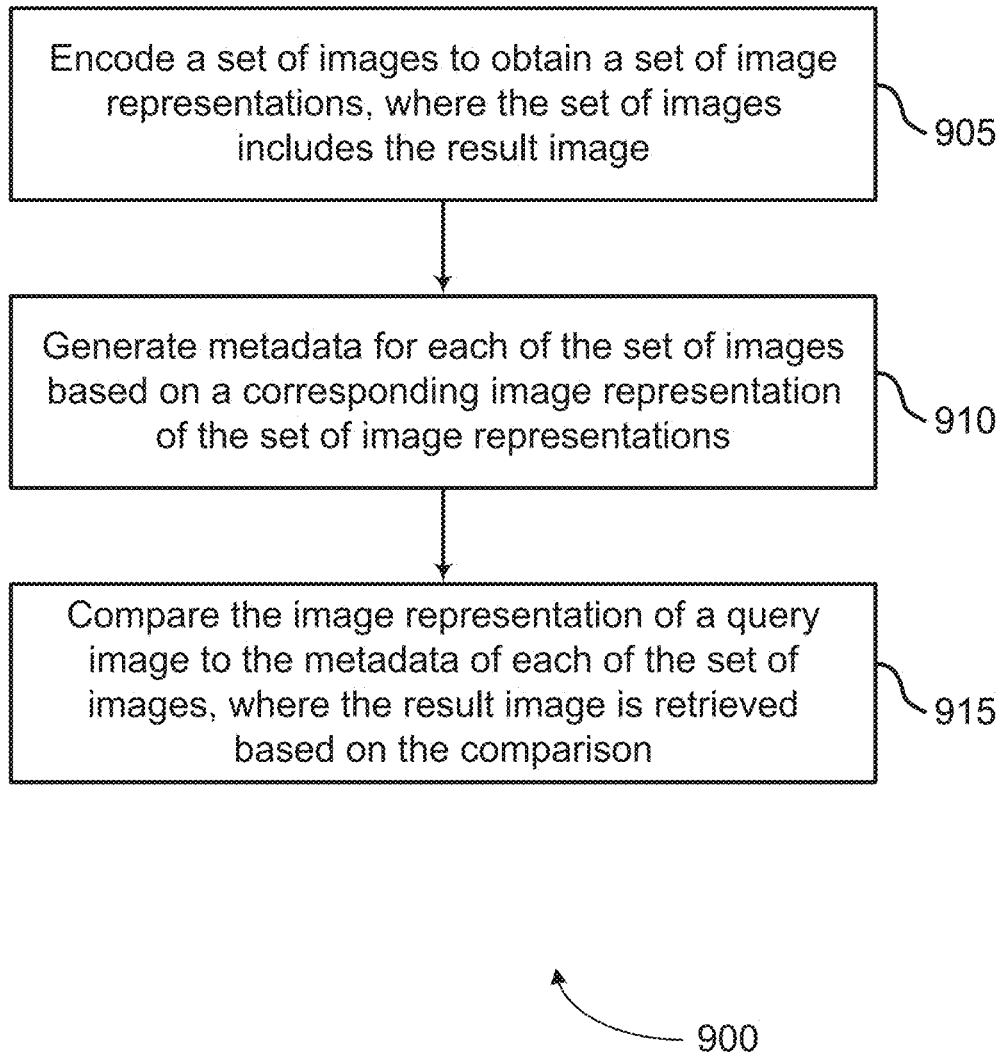
FIG. 9 shows an example of a method for retrieving a result image from a plurality of images according to aspects of the present disclosure.

FIG. 9 shows an example of a method 900 for retrieving a result image from a plurality of images according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system encodes a set of images to obtain a set of image representations, where the set of images includes the result image. In some cases, the operations of this step refer to, or may be performed by, a machine learning model as described with reference to FIGS. 2 and 3. The image representations may include features from the image. For example, the image representations may be outputs from appearance classifiers of the machine learning model. In some cases, the image representations can be mapped to the semantic space described with reference to FIG. 8.

At operation 910, the system generates metadata for each of the set of images based on a corresponding image representation of the set of image representations. In some cases, the metadata for each image in the set of images is generated according to a semantic multinomial output. In some cases, the operations of this step refer to, or may be performed by, a labeling component as described with reference to FIG. 2. In some embodiments, the search component retrieves the result image based on the metadata.

For example, at operation 915, the system compares the image representation of a query image to the metadata of each of the set of images, where the result image is retrieved based on the comparison. In at least one example, the metadata of each of the images include representations generated by the system. In this case, the system may compute a distance between the representation of the query image and a representation of each of the set of images, and then return a result based on the computed distance. In some cases, the operations of this step refer to, or may be performed by, a search component as described with reference to FIG. 2.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image processing, comprising:
receiving a query image comprising a background;
encoding the query image using a machine learning model to obtain an image representation of the background, wherein the machine learning model is trained to encode the background based on a contrastive learning loss using a positive image pair to determine the contrastive learning loss, the positive image pair comprising an original image depicting a foreground object and a modified version of the original image with a region of the foreground object removed and inpainted; and
retrieving a result image based on the image representation, wherein the result image comprises a matching background similar to the background of the query image.

2. The method of claim 1, further comprising:
encoding a plurality of images to obtain a plurality of image representations of a plurality of backgrounds, respectively, wherein the plurality of images includes the result image; and
generating metadata for each of the plurality of images based on a corresponding image representation of the plurality of image representations, wherein the result image is retrieved based on the metadata.

3. The method of claim 2, further comprising:
comparing the image representation of the query image to the metadata of each of the plurality of images, wherein the result image is retrieved based on the comparison.

4. The method of claim 1, further comprising:
retrieving a plurality of result images based on the image representation; and
displaying the plurality of result images in response to the query.

5. The method of claim 1, further comprising:
receiving a training image including the background scene and the foreground object;
removing the foreground object from the image to obtain a modified training image; and
training the machine learning model based on the modified training image.

6. An apparatus for image processing, comprising:
an object detection component configured to detect a foreground object of an image;
an inpainting component configured to inpaint a portion of the image corresponding to the foreground object to remove the foreground object and obtain an inpainted image; and
a machine learning model configured to encode the inpainted image to obtain an image representation that represents a background scene of the image, wherein the machine learning model is trained based on a contrastive learning loss using a positive image pair to determine the contrastive learning loss, the positive image pair comprising the image and the inpainted image.

7. The apparatus of claim 6, further comprising:
a user interface configured to receive a query image comprising a background.

8. The apparatus of claim 6, further comprising:
a search component configured to retrieve a result image based on the image representation, wherein the result image comprises a matching background similar to the background of the query image.

9. The apparatus of claim 6, further comprising:
a training component configured to train the machine learning model based on the contrastive learning loss.

10. The apparatus of claim 6, wherein:
the machine learning model comprises a transformer model with at least one self-attention layer.

11. The apparatus of claim 6, further comprising:
a data collection component configured to retrieve training images based on a masked language model (MLM).

12. A non-transitory computer readable medium storing code, the code comprising instructions that, when executable executed by at least one processor, cause the at least one processor to perform operations comprising:
receiving a query image comprising a background;
encoding the query image using a machine learning model to obtain an image representation of the background, wherein the machine learning model is trained to encode the background based on a contrastive learning loss using a positive image pair to determine the contrastive learning loss, the positive image pair comprising an original image depicting a foreground object and a modified version of the original image with a region of the foreground object removed and inpainted; and
retrieving a result image based on the image representation, wherein the result image comprises a matching background similar to the background of the query image.

13. The non-transitory computer readable medium of claim 12, the code further comprising instructions that, when executed by the at least one processor, cause the at least one processor to perform operations comprising:
encoding a plurality of images to obtain a plurality of image representations of a plurality of backgrounds, respectively, wherein the plurality of images includes the result image; and
generating metadata for each of the plurality of images based on a corresponding image representation of the plurality of image representations, wherein the result image is retrieved based on the metadata.

14. The non-transitory computer readable medium of claim 13, the code further comprising instructions that, when executed by the at least one processor, cause the at least one processor to perform operations comprising:
comparing the image representation of the query image to the metadata of each of the plurality of images, wherein the result image is retrieved based on the comparison.

15. The non-transitory computer readable medium of claim 12, the code further comprising instructions that, when executed by the at least one processor, cause the at least one processor to perform operations comprising:
retrieving a plurality of result images based on the image representation; and
displaying the plurality of result images in response to the query.

16. The non-transitory computer readable medium of claim 12, the code further comprising instructions that, when executed by the at least one processor, cause the at least one processor to perform operations comprising:
receiving a training image including the background scene and the foreground object;
removing the foreground object from the image to obtain a modified training image; and
training the machine learning model based on the modified training image.

* * * * *